United States Patent
Kim (12) United States Patent (10) Patent No.: US 7,082,014 B2
Kim (45) Date of Patent: Jul. 25, 2006

(54) ACTUATOR LOCKING APPARATUS FOR HARD DISK DRIVE

(75) Inventor: Do-wan Kim, Gyconggli-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 419 days.

(21) Appl. No.: 10/702,659

(22) Filed: Nov. 7, 2003

(65) Prior Publication Data

US 2004/0090712 A1 May 13, 2004

(30) Foreign Application Priority Data

Nov. 8, 2002 (KR) .................... 10-2002-0069120

(51) Int. Cl.
*G11B 5/54* (2006.01)
(52) U.S. Cl. .................................. 360/256.2
(58) Field of Classification Search ............. 360/256.2
See application file for complete search history.

(56) References Cited

U.S. PATENT DOCUMENTS

| | | | | |
|---|---|---|---|---|
| 5,583,724 A | * | 12/1996 | Kim et al. | 360/256.2 |
| 5,729,405 A | * | 3/1998 | Isomura et al. | 360/256.2 |
| 5,812,346 A | * | 9/1998 | Williams et al. | 360/256.2 |
| 6,028,744 A | * | 2/2000 | Amirkiai et al. | 360/256.2 |
| 6,654,207 B1 | * | 11/2003 | Hong et al. | 360/256.2 |
| 2004/0179304 A1 | * | 9/2004 | Chang et al. | 360/256.2 |
| 2005/0275973 A1 | * | 12/2005 | Kim | 360/256.2 |

FOREIGN PATENT DOCUMENTS

| KR | 1999-52439 | 7/1999 |
|---|---|---|
| KR | 1999-57993 | 7/1999 |

OTHER PUBLICATIONS

Examiner *Ahn*, Korean Office Action for application No. 10-2002-0069120, issued on Oct. 25, 2004, 3 pp.

* cited by examiner

*Primary Examiner*—Robert S. Tupper
(74) *Attorney, Agent, or Firm*—Staas & Halsey LLP (57) ABSTRACT

An actuator locking apparatus for a hard disk drive having a voice coil motor with at least one magnet attached to at least one of an upper yoke and a lower yoke of the voice coil motor to maintain a magnetic head mounted on an actuator of the hard disk drive in a parked state, the apparatus including a coupling protrusion protruding from an end of an arm of the actuator; a contact part protruding from an edge of either the upper yoke or the lower yoke, contacting a surface of the other of the upper yoke or the lower yoke, and having a slot at a height corresponding to a center of the coupling protrusion; a damping member having a coupling hole in which the coupling protrusion is inserted; and a metal piece attached to one side of the damping member and adhering to the contact part due to magnetic force when the magnetic head is parked.

19 Claims, 5 Drawing Sheets

ACTUATOR LOCKING APPARATUS FOR HARD DISK DRIVE

CROSS-REFERENCE TO RELATED APPLICATIONS

This application claims the benefit of Korean Patent Application No. 2002-69120, filed on Nov. 8, 2002, in the Korean Intellectual Property Office, the disclosure of which is incorporated herein by reference.

BACKGROUND OF THE INVENTION

1. Field of the Invention

The present invention relates to a hard disk drive, and, more particularly, to an actuator locking apparatus for a hard disk drive, by which an actuator is locked so that a magnetic head can not escape from a parking zone of a hard disk when rotation of the hard disk stops.

2. Description of the Related Art

A hard disk drive (HDD) is an auxiliary memory device of a computer and reads out data stored on a magnetic disk or writes data on the magnetic disk using a magnetic head.

Figure 1:
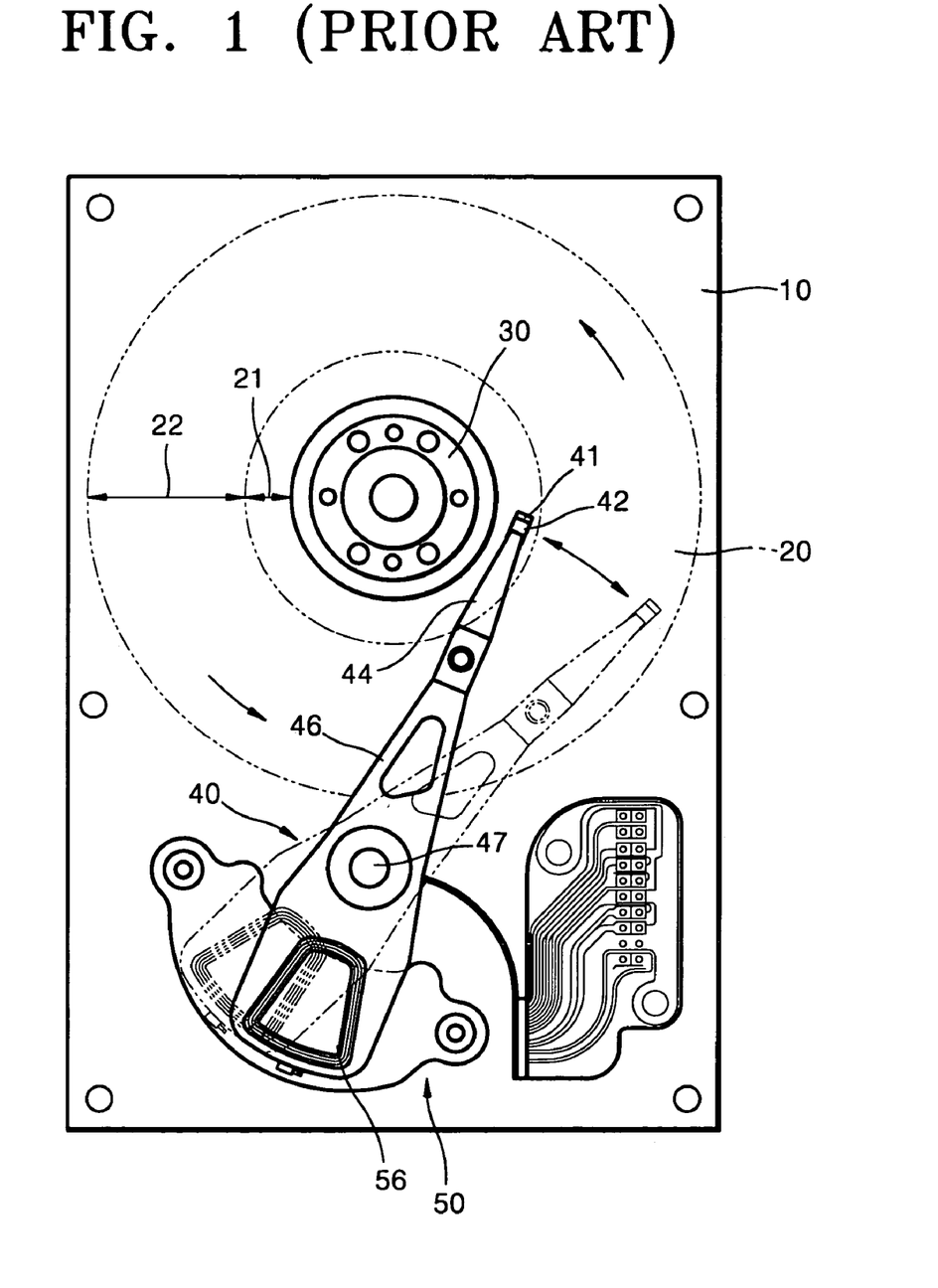
FIG. 1 is a plane view schematically illustrating a conventional hard disk drive.
Figure 2:
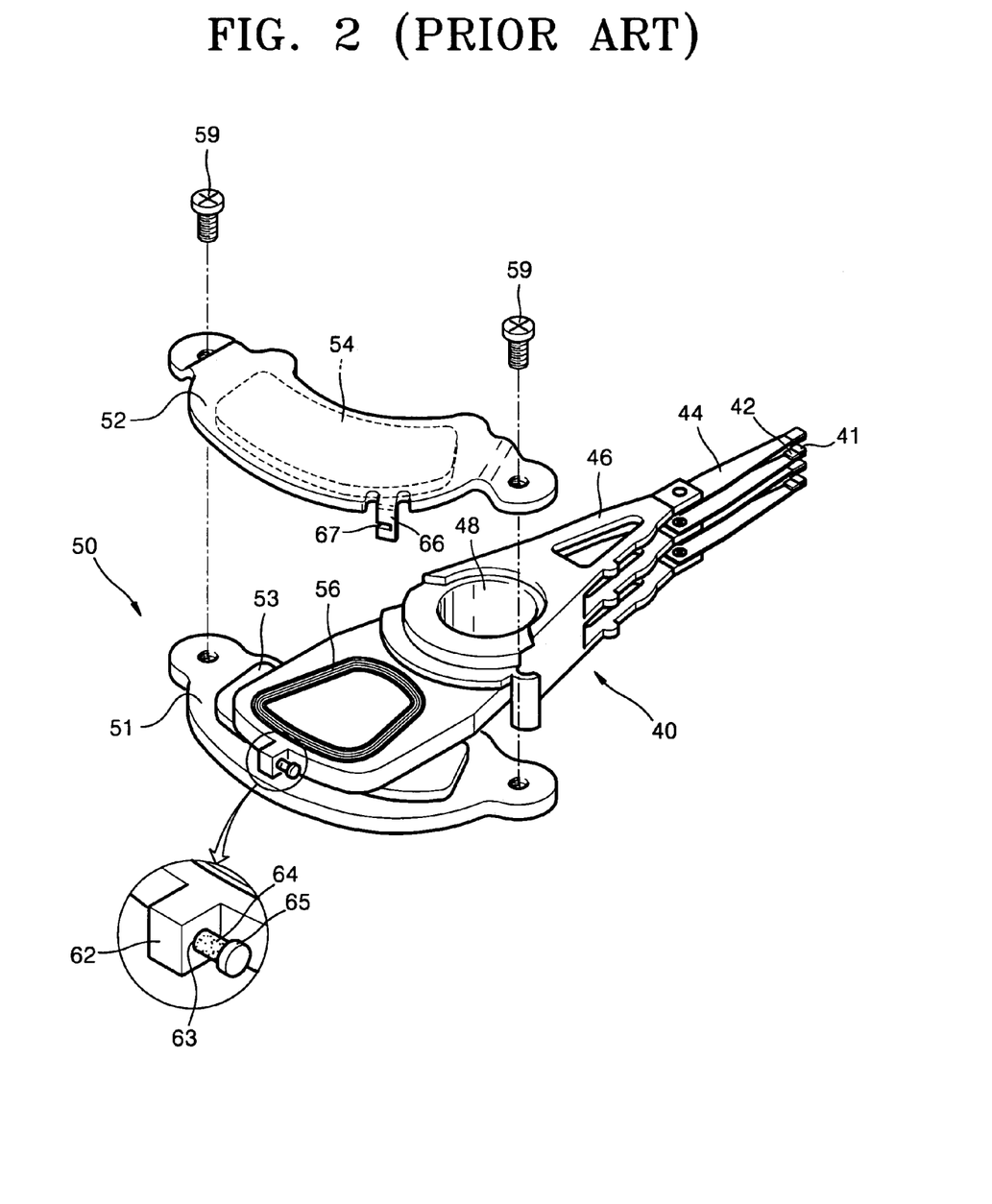
FIG. 2 is an exploded perspective view illustrating a conventional actuator, a conventional voice coil motor, and a conventional actuator locking apparatus of the conventional hard disk drive of FIG. 1.
Figure 3:
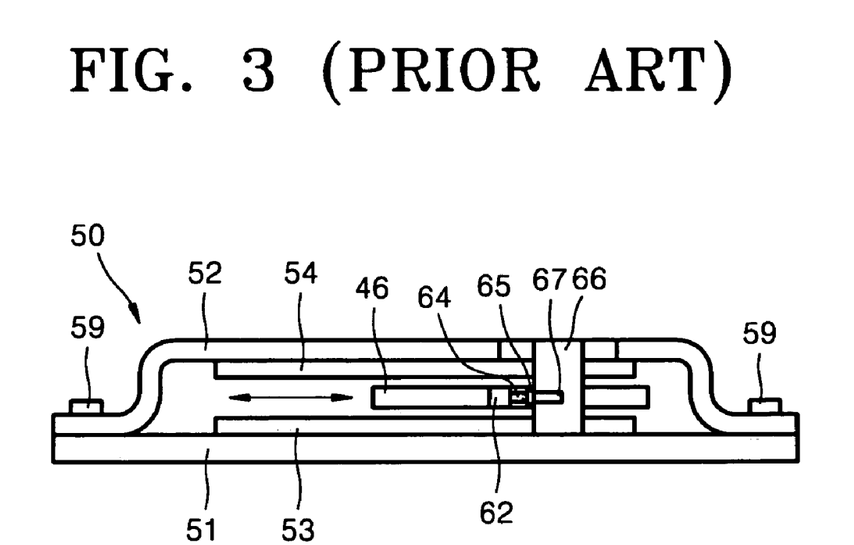
FIG. 3 is a cross-sectional view illustrating the voice coil motor and the actuator locking apparatus of FIG. 2.

FIG. 1 is a plane view schematically illustrating a conventional hard disk drive. FIG. 2 is an exploded perspective view illustrating a conventional actuator, a conventional voice coil motor, and a conventional actuator locking apparatus. FIG. 3 is a side view illustrating the voice coil motor and the actuator locking apparatus of FIG. 2.

Referring to FIGS. 1 and 2, a conventional hard disk drive includes a magnetic disk (hard disk) 20 that is a recording medium on which data is recorded, a spindle motor 30 that is installed on a base plate 10 and rotates the disk 20, and an actuator 40 having a magnetic head 41 that writes data on the disk 20 and reproduces the data written on the disk 20.

In general, the disk 20, or a plurality of disks spaced apart a predetermined distance, is rotated by the spindle motor 30. Also, when the hard disk drive is turned off, a slider 42, in which the magnetic head 41 is mounted, is moved from a data zone 22 in which a magnetic signal is written and then seated on a parking zone 21, provided at an inner circumference of the disk 20.

The actuator 40 pivots around a pivot shaft 47 provided on the base plate 10. The actuator 40 includes an arm 46 having a pivot hole 48 formed in the middle of the arm 46 to receive the pivot shaft 47. A suspension 44, which supports the slider 42 to be elastically-biased toward the surface of the disk 20, is installed at one end of the arm 46.

The actuator 40 is actuated by a voice coil motor (VCM) 50. The VCM 50 includes a coil 56 that is coupled with the other end of the arm 46. A lower yoke 51 is installed a predetermined distance under the coil 56 and is fixedly attached to the base plate 10. An upper yoke 52 is installed above the coil 56 and is coupled with the lower yoke 51 by a screw 59. Magnets 53 and 54 are attached to the top surface of the lower yoke 51 and the bottom surface of the upper yoke 52, respectively, and each of the magnets 53 and 54 is spaced apart from the coil 56 by a predetermined distance.

In a conventional hard disk drive having the above-described structure, while data are written/reproduced on/from the disk 20, a lifting force caused by the rotation of the disk 20 and an elastic force generated by the suspension 44 act on the slider 42 to lift the slider 42 from the data zone 22 of the disk 20 to a height at which the lifting force and the elastic force balance each other. Thus, the magnetic head 41 mounted in the slider 42 is maintained at a constant interval from the rotating disk 20 and writes and reproduces data on and from the disk 20.

When the hard disk drive is turned off and the rotation of the disk 20 stops, because the lifting force by which the slider 42 is lifted diminishes, the slider 42 moves from the data zone 22 of the disk 20 such that the slider 42 does not contact the data zone 22, preventing damage to the data zone 22. That is, if the arm 46 of the actuator 40 is rotated by the VCM 50 so that the slider 42 is moved to the parking zone 21 of the disk 20 before the rotation of the disk 20 stops completely, the slider 42 is seated on the parking zone 21 when rotation of the disk 20 stops, and, thus, damage to the data zone 22 can be prevented.

Referring to FIGS. 2 and 3, a conventional actuator locking apparatus, which locks the actuator 40 so that the actuator 40 does not rotate after the slider 42 is seated on the parking zone 21 of the disk 20, is provided in the hard disk drive. That is, the actuator locking apparatus prevents the actuator 40 from rotating due to an external shock or vibration when the hard disk drive is turned off and prevents the magnetic head 41 from escaping from the parking zone 21 and moving to the data zone 22.

The conventional actuator locking apparatus is a magnetic latch-type locking apparatus that locks the actuator 40 using a magnetic force of the magnets 53 and 54 and includes a metal piece 65 installed at an end of the arm 46 and a contact part 66 in the upper yoke 52 to which the metal piece 65 adheres to by the magnetic force.

The installation structure of the metal piece 65 is as follows. A support part 62 protrudes from an end of the arm 46, and a hole 63 having a predetermined depth is formed in a horizontal direction on a surface of the support part 62. The support part 62 and the hole 63 are integrally formed with the arm 46 by plastic injection molding. A rubber damper 64 is securely fixed in the hole 63, and the metal piece 65 is attached to an end of the rubber damper 64. The rubber damper 64 attenuates a shock generated when the metal piece 65 that corresponds to the metal piece 65. Magnetic flux flows through the contact part 66 due to the magnets 53 and 54 respectively provided in the lower yoke 51 and the upper yoke 52. The metal piece 65 in the arm 46 is magnetically attracted to the contact part 66, due to the magnetic flux within the slot 67, thereby locking the actuator 40.

A plurality of disks are installed in the conventional hard disk drive to increase data storage capacity. However, recently, the surface recording density of disks has rapidly increased such that sufficient data can be stored using only one or two disks. In particular, a hard disk drive that writes data on only one side of a disk has recently been developed. In this case, an actuator having one magnetic head and one arm is needed, and a voice coil motor using one magnet installed only in an upper or a lower portion of a coil is generally used in such an actuator. Accordingly, the overall height of the actuator and the voice coil motor is reduced, and, thus, the hard disk drive can be miniaturized.

However, in a hard disk drive having a single magnet voice coil motor, the actuator is manufactured by press-processing a metallic material having a thickness smaller than a two-magnet voice coil motor. Thus, a hole in which a rubber damper is inserted cannot be formed at an end of an arm of the actuator, and the actuator locking apparatus having the structure as described above cannot be used. As a result, the hard disk drive with the single magnet voice coil motor requires an actuator locking apparatus having a new structure.

SUMMARY OF THE INVENTION

It is an aspect of the present invention to provide an actuator locking apparatus for a hard disk drive, which has a structure suitable for a hard disk drive employing a voice coil motor having one magnet, and provides a more stable latch force.

Additional aspects and/or advantages of the invention will be set forth in part in the description which follows and, in part, will be obvious from the description, or may be learned by practice of the invention.

To achieve the above and/or other aspects of the present invention, there is provided an actuator locking apparatus for a hard disk drive having an actuator moving a magnetic head on an arm of the actuator, and a voice coil motor with at least one magnet, an upper yoke and a lower yoke, the actuator locking apparatus locking the actuator using a magnetic force generated by the at least one magnet attached to at least one of the upper yoke and the lower yoke of the voice coil motor to maintain the magnetic head mounted on the actuator of the hard disk drive in a parked state in a parking zone of a disk, the apparatus including a coupling protrusion protruding from an end of the arm of the actuator; a contact part protruding from an edge of either the upper yoke or the lower yoke, contacting a surface of the other of the upper yoke or the lower yoke, and having a slot with a predetermined width at a height corresponding to a center of the coupling protrusion; a damping member having a coupling hole formed therein in which the coupling protrusion is inserted; and a metal piece attached to one side of the damping member and adhering to the contact part due to the magnetic force when the magnetic head is parked in the parking zone.

The coupling protrusion has a rectangular cross-section with a thickness less than a width.

The damping member further includes an insertion groove in which an end of the arm is attached, the insertion groove being formed at an internal side of the damping part to prevent the damping member from twisting. The height of the insertion groove is less than the thickness of the arm.

To achieve the above and/or other aspects of the present invention, there is provided a hard disk drive having an actuator locking apparatus, comprising: an actuator having an arm and moving a magnetic head on an end of the arm; a coil combined with another end of the arm; a lower yoke under the end of the arm having the coil; an upper yoke above the coil and spaced apart from the coil a predetermined distance; a magnet attached to a bottom surface of the upper yoke; a coupler protruding from the end of the arm having the coil; a damping member attaching to the coupler; a metal part attached to a side of the damping member; and a contact part protruding from an edge of the upper yoke and bending downward to contact the metal part and a top surface of the lower yoke, the metal part adhering to the contact part by a magnetic force generated by the magnet, and the damping member attenuating a shock produced when the metal part adheres to the contact part.

The actuator locking apparatus for a hard disk drive according to the present invention can be suitably used for a hard disk drive employing a voice coil motor having one magnet, and a metal piece and a contact part contact each other more securely, and, thus, a more stable latch force is provided.

BRIEF DESCRIPTION OF THE DRAWINGS

The above and/or other aspects and advantages of the present invention will become apparent and more readily appreciated from the following description of the a preferred embodiment taken in conjunction with the accompanying drawings in which.

DETAILED DESCRIPTION OF THE PREFERRED EMBODIMENT

Reference will now be made in detail to the embodiment of the present invention, an example of which is illustrated in the accompanying drawings, wherein like reference numerals refer to the like elements throughout. The embodiment is described below to explain the present invention by referring to the figures.

The embodiment of the present invention described below has a magnet attached to a bottom surface of an upper yoke of a voice coil motor.

Figure 4:
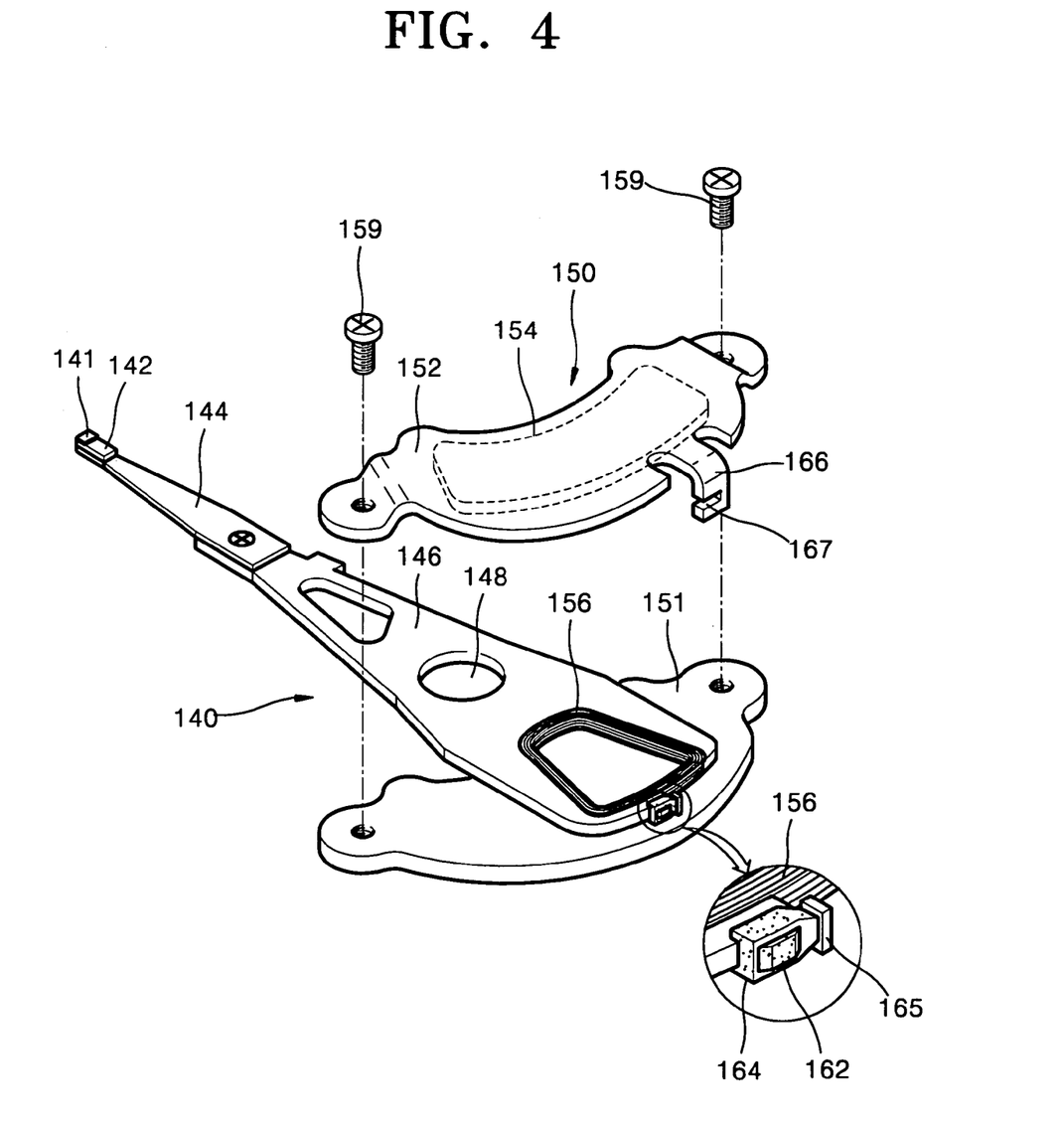
FIG. 4 is an exploded perspective view illustrating an actuator and a voice coil motor in which an actuator locking apparatus according to the present invention is installed.

FIG. 4 is an exploded perspective view illustrating an actuator and a voice coil motor in which an actuator locking apparatus according to the present invention is installed. Referring to FIG. 4, an actuator 140, which moves a magnetic head 141 for writing and reading data on and from a disk (not shown) to and from a predetermined position of the disk, is provided in a hard disk drive. The actuator 140 includes an arm 146, which is installed on a base plate (not shown) of the hard disk drive, that rotates around a pivot hole 148 formed in the middle of the arm 146. The arm 146 is manufactured by press-processing a metallic material, for example, aluminum. A suspension 144, which supports a slider 142 in which the magnetic head 141 is mounted to be elastically-biased toward the surface of the disk, is installed at an end of the arm 146.

A single magnet type of voice coil motor 150 for rotating the actuator 140 is installed in the hard disk drive. The voice coil motor 150 includes a coil 156 coupled with the other end of the arm 146, a lower yoke 151 installed under the coil 156, an upper yoke 152 installed above the coil 156, and a magnet 154 attached to a bottom surface of the upper yoke 152. The lower yoke 151 is fixedly installed on the base plate of the hard disk drive and is spaced apart from the coil 156 a predetermined distance. The upper yoke 152 is coupled with the lower yoke 151 by a screw 159. The magnet 154 is attached to the bottom surface of the upper yoke 152 and is spaced apart from the coil 156 by a predetermined distance. A permanent magnet is used as the magnet 154. The magnet 154 may be attached to a top surface of the lower yoke 151, as well as to the bottom surface of the upper yoke 152.

The voice coil motor 150 having the above-described structure is controlled by a servo control system (not shown)

and rotates the actuator 140 according to Flemming's left hand rule due to interaction between current input into the coil 156 and a magnetic field formed by the magnet 154. That is, when the hard disk drive is turned on and the disk begins to rotate, the voice coil motor 150 rotates the arm 146 and moves the magnetic head 141 from a parking zone to a data zone of the disk. On the contrary, if the hard disk drive is turned off and rotation of the disk stops, the voice coil motor 150 rotates the arm 146 and moves the magnetic head 141 from the data zone to the parking zone of the disk to be seated on the parking zone.

An actuator locking device according to the present invention is provided in the hard disk drive. The actuator locking apparatus locks the actuator 140 so that the magnetic head 141 mounted on the actuator 140 remains parked in the parking zone of the disk. That is, the actuator locking device prevents the actuator 140 from unnecessarily rotating due to an external shock when the hard disk drive is turned off, and prevents the magnetic head 141 from escaping from the parking zone of the disk and moving to the data zone of the disk. If the hard disk drive is turned off and the magnetic head 141 moves to the data zone, the magnetic head 141 directly contacts the data zone, and, thus, the data zone and the magnetic head 141 may be damaged.

The actuator locking apparatus according to the present invention locks the actuator 140 using a magnetic force generated by the magnet 154 attached to the bottom surface of the upper yoke 152 of the voice coil motor 150. The actuator locking apparatus includes a coupling protrusion 162 that protrudes from an end of the arm 146, a damping member 164 inserted onto the coupling protrusion 162, a metal piece 165 attached to one side of the damping member 164, and a contact part 166 formed in the upper yoke 152 to which the metal piece 165 adheres to due to a magnetic force of the magnet 154, with a slot 167 having a predetermined width.

The actuator locking apparatus according to the present invention does not require a hole to install the metal piece 165 on the arm 146 (see FIG. 2), and, thus, can be easily used for an actuator having the arm 146 formed of a metal-pressed material.

The structure and operation of the actuator locking apparatus according to the present invention is described below with reference to the accompanying drawings.

Figure 5:
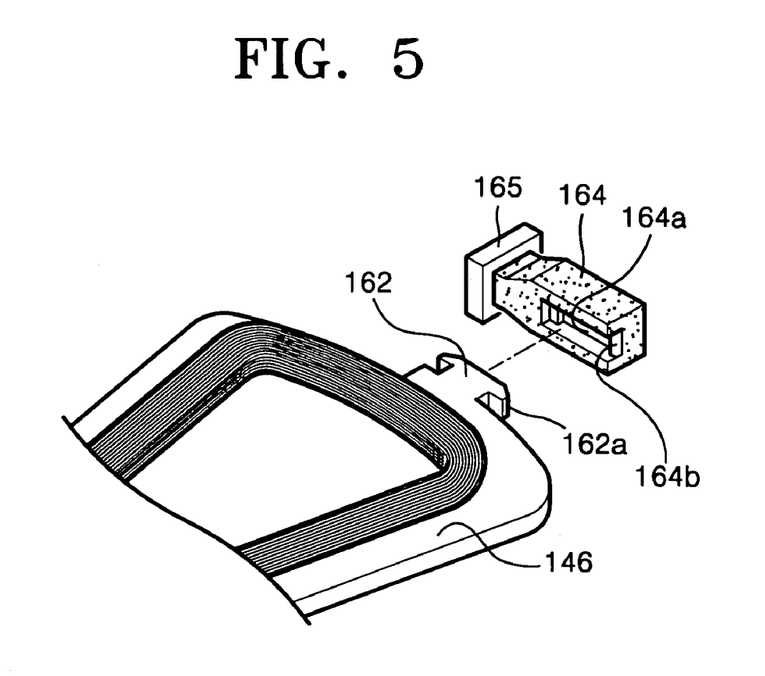
FIG. 5 is a partial enlarged perspective view illustrating the actuator locking apparatus of FIG. 4.
Figure 6:
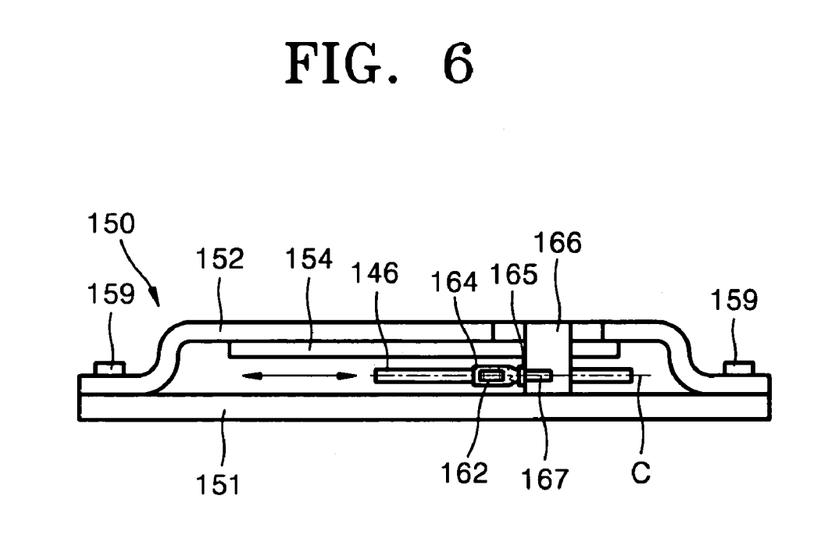
FIG. 6 is a cross-sectional view illustrating the voice coil motor and the actuator locking apparatus of FIG. 4.

FIG. 5 is a partial enlarged perspective view illustrating the actuator locking apparatus according to the present invention. FIG. 6 is a side view illustrating the voice coil motor 150 and the actuator locking apparatus according to the present invention. The same reference numerals used in FIG. 4 represent the same elements in FIGS. 5 and 6.

Referring to FIGS. 5 and 6, in the actuator locking apparatus according to the present invention, the coupling protrusion 162 protrudes from one end of the arm 146. The coupling protrusion 162 has a rectangular cross-section having a thickness less than a width, the width being in a rotation direction of the arm 146. The coupling protrusion 162 having this shape prevents the damping member 164, when combined with the coupling protrusion 162, from being easily twisted, thereby stably maintaining contact between the metal piece 165 and the contact part 166. A projection 162a is formed in a protrusion end of the coupling protrusion 162. The projection 162a prevents the damping member 164 inserted in the coupling protrusion 162 from escaping from the coupling protrusion 162.

The damping member 164 is combined with the coupling protrusion 162. The damping member 164 attenuates shock occurring when the metal piece 165 contacts the contact part 166. The damping member 164 may be formed of a shock-absorbing material, for example, rubber. A perforated coupling hole 164a is formed in the damping member 164, and has a shape and size corresponding to a cross-sectional shape and size of the coupling protrusion 162 that is inserted in and combined with the coupling protrusion 162 provided in the arm 146. Because the damping member 164 has a predetermined elasticity, the size of the coupling hole 164a may be formed slightly smaller than the size of the coupling protrusion 162 to more securely combine the coupling protrusion 162 with the damping member 164.

When the damping member 164 is combined with the coupling protrusion 162, if the damping member 164 is not correctly maintained in a horizontal state, but is twisted, the metal piece 165 will not correctly contact the contact part 166. Thus, the latch force is reduced, and it becomes difficult to maintain a stable locking state of the actuator. Also, if the variation amount of the latch force is high, a servo code for locking release cannot be easily implemented when the hard disk drive is turned on, and the locking state cannot be stabilized.

Thus, as described above, the coupling protrusion 162 is formed within a rectangular cross-section, and the size of the coupling hole 164a formed in the damping member 164 is slightly smaller than the size of the coupling protrusion 162 to prevent the damping member 164 from being twisted.

Further, in the present embodiment, an insertion groove 164b, in which part of the arm 146 is inserted, is formed at an internal side of the damping member 164, that is, in a side contacting the arm 146 so that the damping member 164 remains horizontal. The insertion groove 164b is longer along a lengthwise direction of the damping member 164 and has a height corresponding to the thickness of the arm 146. The height of the insertion groove 164b is determined such that the damping member 164 closely adheres to the end of the arm 146 and is securely inserted in the insertion groove 164b of the damping member 164. For example, depending on the predetermined elasticity of the damping member 164, the height of the insertion groove 164b may be slightly less than the thickness of the arm 146. As such, the damping member 164 can remain horizontal, and the metal piece 165 and the contact part 166 contact each other more accurately, and thus, a stable latch force can be obtained.

The metal piece 165 is formed of stainless steel, for example, and is securely attached to one side of the damping member 164, that is, a side thereof facing the contact part 166. The metal piece 165 is attached to the damping member 164 so that the center of the metal piece 165 is on a center line C of the arm 146.

The contact part 166 protrudes from an edge of the upper yoke 152 of the voice coil motor 150 and is bent downward, and a bottom surface of the contact part 166 contacts a top surface of the lower yoke 151. The contact part 166 has the slot 167 having a predetermined width at a height corresponding to the metal piece 165, that is, at a height corresponding to a center of the coupling protrusion 162. Thus, the center of the coupling protrusion 162 is aligned with the center line C of the arm 146, and the slot 167 is provided at a height identical to the center line C of the arm 146. The contact part 166 may also bend upward so that it is protrudes from an edge of the lower yoke 151 and contacts a bottom surface of the upper yoke 152.

In the actuator locking apparatus having the above-described structure, the upper yoke 152 is magnetized by the magnet 154 attached to its bottom surface. Thus, a magnetic flux flows from a bending part of the contact part 166 of the upper yoke 152 toward the lower yoke 151. The metal piece 165 installed in the arm 146 is magnetically attracted to the contact part 166 due to the magnetic flux around the slot 167.

According to the present invention, the damping member 164 remains horizontal so that the metal piece 165 contacts the contact part 166 completely. Thus, the latch force between the metal piece 165 and the contact part 166 is stably maintained, and the actuator 140 can be securely locked when the hard disk drive is turned off.

As described above, the actuator locking apparatus for a hard disk drive according to the present invention can be easily applied to an actuator having an arm formed of a metal-pressed material, for a hard disk drive employing a voice coil motor having one magnet. In addition, a damping member remains securely horizontal due to the shapes and combination of a coupling protrusion and a coupling hole of the damping member, such that a metal piece installed in an arm of the actuator can more securely contact a contact part. Thus, a latch force between the metal piece and the contact part is stably maintained such that the actuator can be securely locked when the hard disk drive is turned off.

Although the present invention is shown and described based on a magnet being attached to a bottom surface of an upper yoke of a voice coil motor, the present invention may also be applied to a voice coil motor having a magnet attached to a top surface of a lower yoke of the voice coil motor. Also, the contact part to which the metal piece adheres to by a magnetic force may protrude from the lower yoke, with the contact part being bent to contact the bottom surface of the upper yoke.

In addition, the actuator locking apparatus according to the present invention is suitable for a hard disk drive employing a voice coil motor having one magnet, but is not limited to this configuration. The actuator locking apparatus may also be used for a hard disk drive having a voice coil motor in which two magnets are attached to the upper and lower yokes, respectively. Also, the actuator locking apparatus according to the present invention may be used when the arm of the actuator is formed of a metal-pressed material or a plastic injection material.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. An actuator locking apparatus for a hard disk drive having an actuator moving a magnetic head on an arm of the actuator, and a voice coil motor with at least one magnet, an upper yoke and a lower yoke, the actuator locking apparatus locking the actuator using a magnetic force generated by the at least one magnet attached to at least one of the upper yoke and the lower yoke of the voice coil motor to maintain the magnetic head mounted on the actuator of the hard disk drive in a parked state in a parking zone of a disk, the apparatus comprising:
   a coupling protrusion protruding from an end of the arm of the actuator;
   a contact part protruding from an edge of either the upper yoke or the lower yoke, contacting a surface of the other of the upper yoke or the lower yoke, and having a slot with a predetermined width at a height corresponding to a center of the coupling protrusion;
   a damping member having a coupling hole formed therein in which the coupling protrusion is inserted; and
   a metal piece attached to one side of the damping member and adhering to the contact part due to the magnetic force when the magnetic head is parked in the parking zone.

2. The apparatus of claim 1, wherein the coupling protrusion has a rectangular cross-section with a thickness less than a width.

3. The apparatus of claim 1, wherein the damping member further comprises an insertion groove in which an end of the arm is attached, the insertion groove being formed at an internal side of the damping part to prevent the damping member from twisting.

4. The apparatus of claim 3, wherein a height of the insertion groove is less than a thickness of the arm.

5. The apparatus of claim 1, wherein the damping member is formed of a shock-absorbing rubber.

6. The apparatus of claim 1, wherein the at least one magnet comprises one magnet attached to a bottom surface of the upper yoke, and the contact part is provided in the upper yoke.

7. The apparatus of claim 1, wherein the arm is formed of a metal-pressed material.

8. The apparatus of claim 1, wherein the at least one magnet of the voice coil motor of the hard disk drive comprises one magnet.

9. The apparatus of claim 8, wherein the arm is formed of a metal-pressed material.

10. The apparatus of claim 1, wherein the at least one magnet comprises one magnet attached to a top surface of the lower yoke, and the contact part is provided in the lower yoke and bends upward to contact a bottom surface of the upper yoke.

11. The apparatus of claim 1, wherein the at least one magnet comprises two magnets attached to the upper yoke and the lower yoke, respectively.

12. The apparatus of claim 1, wherein the arm is formed of a plastic injection material.

13. A hard disk drive having an actuator locking apparatus, comprising:
   an actuator having an arm and moving a magnetic head on an end of the arm;
   a coil combined with another end of the arm;
   a lower yoke under the end of the arm having the coil;
   an upper yoke above the coil and spaced apart from the coil a predetermined distance;
   a magnet attached to a bottom surface of the upper yoke;
   a coupler protruding from the end of the arm having the coil;
   a damping member attaching to the coupler;
   a metal part attached to a side of the damping member; and
   a contact part protruding from an edge of the upper yoke and bending downward to contact the metal part and a top surface of the lower yoke, the metal part adhering to the contact part by a magnetic force generated by the magnet, and the damping member attenuating a shock produced when the metal part adheres to the contact part.

14. The hard disk drive of claim 13, wherein the magnet is a permanent magnet.

15. The hard disk drive of claim 13, wherein the coupler comprises a projection extending from an end of the coupler to hold the damping member on the coupler.

16. The hard disk drive of claim 13, wherein the damping member comprises a coupling hole to insert the damping member onto the coupler, the coupling hole having a shape and a size corresponding to a cross-sectional shape and size of the coupler.

17. The hard disk drive of claim 13, wherein the damping member comprises a coupling hole to insert the damping member onto the coupler, the coupling hole being smaller than a size of the coupler.

18. The hard disk drive of claim 13, wherein the metal part is attached to a side of the damping member facing the contact part with a center of the metal part being aligned with a center of the arm.

19. The hard disk drive of claim 13, wherein the upper yoke is magnetized by the magnet attached to the bottom surface of the upper yoke, generating a magnetic flux that flows from the contact part of the upper yoke to the metal part and the lower yoke to adhere the metal part to the contact part.

* * * * *

UNITED STATES PATENT AND TRADEMARK OFFICE
CERTIFICATE OF CORRECTION

PATENT NO. : 7,082,014 B2  Page 1 of 1
APPLICATION NO. : 10/702659
DATED : July 25, 2006
INVENTOR(S) : Do-Wan Kim It is certified that error appears in the above-identified patent and that said Letters Patent is hereby corrected as shown below:

Title page, item [75] Column 1 (Inventor), Line 1, change "Gyconggli-do" to --Gyeonggi-do--.

Signed and Sealed this

First Day of May, 2007

JON W. DUDAS
*Director of the United States Patent and Trademark Office*